US012038152B2

(12) United States Patent
Dross

(10) Patent No.: US 12,038,152 B2
(45) Date of Patent: Jul. 16, 2024

(54) LUMINAIRE

(71) Applicant: LEDLENSER GMBH & CO. KG, Solingen (DE)

(72) Inventor: Oliver Dross, Hilden (DE)

(73) Assignee: LEDLENSER GMBH & CO. KG, Solingen (DE)

( * ) Notice: Subject to any disclaimer, the term of this patent is extended or adjusted under 35 U.S.C. 154(b) by 0 days.

(21) Appl. No.: 18/279,253

(22) PCT Filed: Feb. 3, 2022

(86) PCT No.: PCT/DE2022/100093
§ 371 (c)(1),
(2) Date: Aug. 29, 2023

(87) PCT Pub. No.: WO2022/223067
PCT Pub. Date: Oct. 27, 2022

(65) Prior Publication Data
US 2024/0142087 A1 May 2, 2024

(30) Foreign Application Priority Data
Apr. 22, 2021 (DE) .................... 20 2021 102 154.3

(51) Int. Cl.
*F21V 13/02* (2006.01)
*F21V 5/00* (2018.01)
*F21V 23/04* (2006.01)

(52) U.S. Cl.
CPC .............. *F21V 13/02* (2013.01); *F21V 5/007* (2013.01); *F21V 23/04* (2013.01)

(58) Field of Classification Search
CPC ........... F21V 13/02; F21V 5/007; F21V 23/04
See application file for complete search history.

(56) References Cited

U.S. PATENT DOCUMENTS

2012/0155102 A1* 6/2012 Melzner .................... F21V 5/04 362/510

FOREIGN PATENT DOCUMENTS

DE 202009011500 U1 12/2010
DE 102015203890 A1 9/2016

(Continued)

*Primary Examiner* — Mary Ellen Bowman
(74) *Attorney, Agent, or Firm* — McGlew and Tuttle, P.C.

(57) ABSTRACT

Luminaire with channels $K_n$, each have a light source and a collimator. Each channel produces a light cone having different opening angles. The channels form a sequence $(K_n)_{n-1,...,N}$, the light cones having progressively greater or smaller opening angles $\alpha_n$. The intensity $I_n(x)$ of the channels, controlled by a manipulated variable x by an actuator, are dependent on the manipulated variable and each follow a curve having a maximum and a rising edge and/or a falling edge. The curves of adjacent channels $K_{n-1}$, $K_n$, $K_{n+1}$ are shifted in relation to one another such that a reduction in the intensity of a channel, controlled by the actuator, is associated with an increase in the intensity of an adjacent channel $K_{n\pm1}$ and an increase in intensity of a channel, controlled by the actuator, is associated with a reduction in intensity of an adjacent channel $K_{n\pm1}$.

15 Claims, 7 Drawing Sheets

(56) References Cited

FOREIGN PATENT DOCUMENTS

| | | | |
|---|---|---|---|
| EP | 3553374 | A1 | 10/2019 |
| WO | 2008066785 | A2 | 6/2008 |
| WO | 2016041994 | A1 | 3/2016 |

* cited by examiner

LUMINAIRE

CROSS REFERENCE TO RELATED APPLICATIONS

This application is a United States National Phase Application of International Application PCT/DE2022/100093, filed Feb. 3, 2022, and claims the benefit of priority under 35 U.S.C. § 119 of German Application 20 2021 102 154.3, filed Apr. 22, 2021, the entire contents of which are incorporated herein by reference.

TECHNICAL FIELD

The present invention pertains to a luminaire having a plurality of channels $K_n$, each having a light source and a collimator.

BACKGROUND

Generic luminaires are usually designed as portable luminaires in the form of torches or headlamps. In order to be able to illuminate the area ahead at different distances by means of such luminaires, luminaires known according to the prior art have a mechanical zoom with which the distance between the light source and the collimator can be changed with the result that narrower or wider light distributions are produced depending on the setting. By means of a narrow light distribution the spot beam—distant areas of the area ahead can be illuminated and by means of a wide light distribution—the flood beam—close areas of the area ahead can be illuminated.

Mechanical zooming is sometimes disadvantageous because it requires several parts to move in relation to each other, making it difficult to effectively seal a luminaire housing against dust and/or water ingress. Furthermore, a mechanical zoom requires a lot of space. The handling of a mechanical zoom is also disadvantageous, because it is not uncommon to need two hands for this and moving the components is only possible with a comparatively high amount of force due to possible jamming. Finally, the quality of the light distribution is moderate, because an optimal light distribution is always produced by a collimator only at a specific distance between light source and collimator. Zoom-related deviations from the optimal position therefore inevitably lead to suboptimal illumination of the area ahead.

SUMMARY

An object of the present invention to propose a luminaire, in particular a portable luminaire in the form of a pocket lamp or headlamp, which remedies the aforementioned disadvantages. In particular, the aim is to create a zoomable luminaire that requires little space, is easy to seal, is easy to handle and produces an optimal light distribution independent of the zoom setting and therefore independent of the set width of the light distribution.

This object is achieved by the luminaire according to the invention. The following is provided according to the invention.

Each channel $K_n$ produces a light cone having different opening angles $\alpha_n$. The opening angles $\alpha_n$ of the light cones refer to the half-value width FWHM (full width at half maximum) of the light intensity emitted by the channels.

The channels $K_n$ form a sequence $(K_n)_{n=1, \ldots, N}$, the light cones of which have progressively greater or progressively smaller opening angles $\alpha_n$. In other words, the channels $K_n$ are the consecutively numbered members of the sequence $(K_n)_{n=1, \ldots, N}$, with index n and number N of channels. For N, N E N therefore applies. The elements of the sequence $(K_n)_{n=1, \ldots, N}$ and thus the channels $K_n$ are numbered in such a way that the opening angles of the light cones, starting from the first element/channel $K_1$ up to the last element/channel $K_N$, become either gradually greater or gradually smaller.

By setting a manipulated variable by means of an actuator, the intensity of the channels $K_n$ can be controlled. This means that the intensity of the light produced by the light sources in the channels is controllable. The intensities of the channels are dependent on the manipulated variable and each follow a curve having a maximum as well as a rising edge and/or a falling edge, wherein the curves of adjacent channels $K_{n-1}$, $K_n$, $K_{n+1}$ are shifted in relation to one another in such a way that a) a reduction in the intensity of a channel $K_n$ controlled by the actuator is at least partially associated with an increase in the intensity of an adjacent channel $K_{n+1}$, and b) an increase in the intensity of a channel $K_n$ controlled by the actuator is at least partially associated with a reduction in the intensity of an adjacent channel $K_{n+1}$.

In addition to a maximum, suitable curves have at least one rising edge or one falling edge. Independently of this, the curves can have both a rising edge and a falling edge in addition to a maximum. This allows a step-by-step increase or reduction of the emitted light cone without having to mechanically move the collimators in relation to the associated light sources. When the emitted light cone is gradually increased or reduced, a continuous increase or decrease in the intensity of the controlled channels is also created, resulting in a smooth transition between different zoom settings. The setting of the emitted light cone is thus completely electronic, which is why such a zoomable luminaire advantageously requires less space and is easy to seal and handle. Furthermore, the collimators can be optimally designed for the fixed distance to the respective assigned light source, such that an optimal light distribution results independent of the setting.

Preferred embodiments of the present invention are provided below and in the sub-claims.

Firstly, it is preferably provided that the manipulated variable-dependent intensities $l_n(x)$ each follow a bell-shaped curve with a rising edge, a maximum and a falling edge. The bell-shaped curve is open at the bottom.

In an advantageous development of the invention, it is provided that the maximum intensity of a channel $K_n$ coincides with the end of the falling edge of the left-hand adjacent channel $K_{n-1}$ and with the beginning of the rising edge of the right-hand adjacent channel $K_{n+1}$. With such a shift, in particular with such a phase shift between the manipulated variable-dependent intensities, no further channel is controlled when the intensity of a channel $K_n$ is at maximum. Only by changing the manipulated variable by means of the actuator is the intensity of the previously controlled channel $K_n$ reduced, while the intensity of an adjacent channel $K_{n+1}$ is increased until the actuator is also set here so that the adjacent channel $K_{n+1}$ produces its maximum intensity. This results in a smooth zooming effect between different channels and a uniform light distribution, as only one or two channels are controlled, regardless of the setting, which is why the light distribution has a maximum of two areas with different light intensities.

According to a further advantageous development of the invention, it is provided that the intensities of the channels $K_n$ are linear in the area of the rising edge and/or in the area of the falling edge. Preferably, it is provided that the intensities of the channels $K_n$ between the beginning of the rising edge and the end of the falling edge follow a triangular function with a linear rising edge and a linear falling edge.

Alternatively, in a preferred embodiment of the invention, it is provided that the intensities of the channels $K_n$ in the area of the rising edge and/or in the area of the falling edge follow a function in the form $$l_n(x)=\sin^a(x+\phi_n).$$

Here, x is the manipulated variable of the actuator. The constant a is an element of the real numbers and greater than or equal to 2, whereby the following applies: $\{a \in \mathbb{R} | a \geq 2\}$. Finally, $\phi_n$ denotes the phase shift of the considered channel $K_n$. If both the rising edge and the falling edge follow the function $l_n(x)=\sin^a(x+\phi_n)$, there is a bell-shaped curve between the beginning of the rising edge and the end of the falling edge. However, the rising edge, the falling edge and/or the bell-shaped curve can also have any other shape, wherein the curve is preferably continuous and/or continuously differentiable.

According to a preferred embodiment of the invention, the actuator for setting the manipulated variable and thus for setting the intensity of the controlled channels $K_n$ and for carrying out the electronically controlled zooming is an encoder, in particular a rotary encoder, a slide control or a push button. The manipulated variable is set by turning a knob in the case of a rotary encoder and by moving a slider in the case of a slide control. On the other hand, a push button can be set in such a way that continuous pressing of the push button results in a continuous change of the manipulated variable and thus in continuous zooming. Repeated pressing of the push button in this case can be associated with a stepwise change of the manipulated variable and thus the selected zoom setting. In addition to the actuators mentioned by way of example, all other conceivable devices for setting an actuating variable are also conceivable, in particular capacitive switches, motion controls in which an actuating variable is entered, for example, by a waving movement in front of the luminaire, or voice control.

According to a preferred embodiment of the invention, it is provided that the sequence $(K_n)_{n=1, \ldots, N}$ of the channels $K_n$ is a finite sequence with a number of N channels $K_1$. This means that the control of the channels $K_n$ takes place stepwise or continuously starting from the first channel $K_1$ to the last channel $K_N$, but that for a changeover from the channel $K_N$ to the channel $K_1$, the sequence of channels $K_n$ must be run through in reverse order. This embodiment is fulfilled, for example, if the actuator is designed as a slide control and the end stops of the slide control coincide with the channel $K_1$ on the left-hand side and with the channel $K_N$ on the right-hand side.

Alternatively, it is provided that the sequence $(K_n)_{n=1, \ldots, N}$ of the channels $K_n$ is a periodic sequence with a period length of the number N of the channels $K_n$ such that the last channel $K_N$ is an adjacent channel of the first channel $K_1$. Consequently: $K_N+1=K_1$. A periodic sequence of channels $K_n$ can be realised, for example, by a rotary encoder or a push button, since neither a rotary encoder nor a push button is or has to be limited by a left-hand or right-hand stop.

Switching on the luminaire can be associated with different settings of the actuator. According to a first advantageous embodiment of the invention, it is provided that the switching on of the luminaire coincides with the last setting made of the actuator. Alternatively, it is provided that the switching on of the luminaire is associated with a constant start setting.

Finally, in a preferred embodiment of the invention, it is provided that the intensity of the channels outside the bell-shaped curve completely fades or assumes a constant value.

In the following, specific embodiments of the present invention are explained in more detail on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
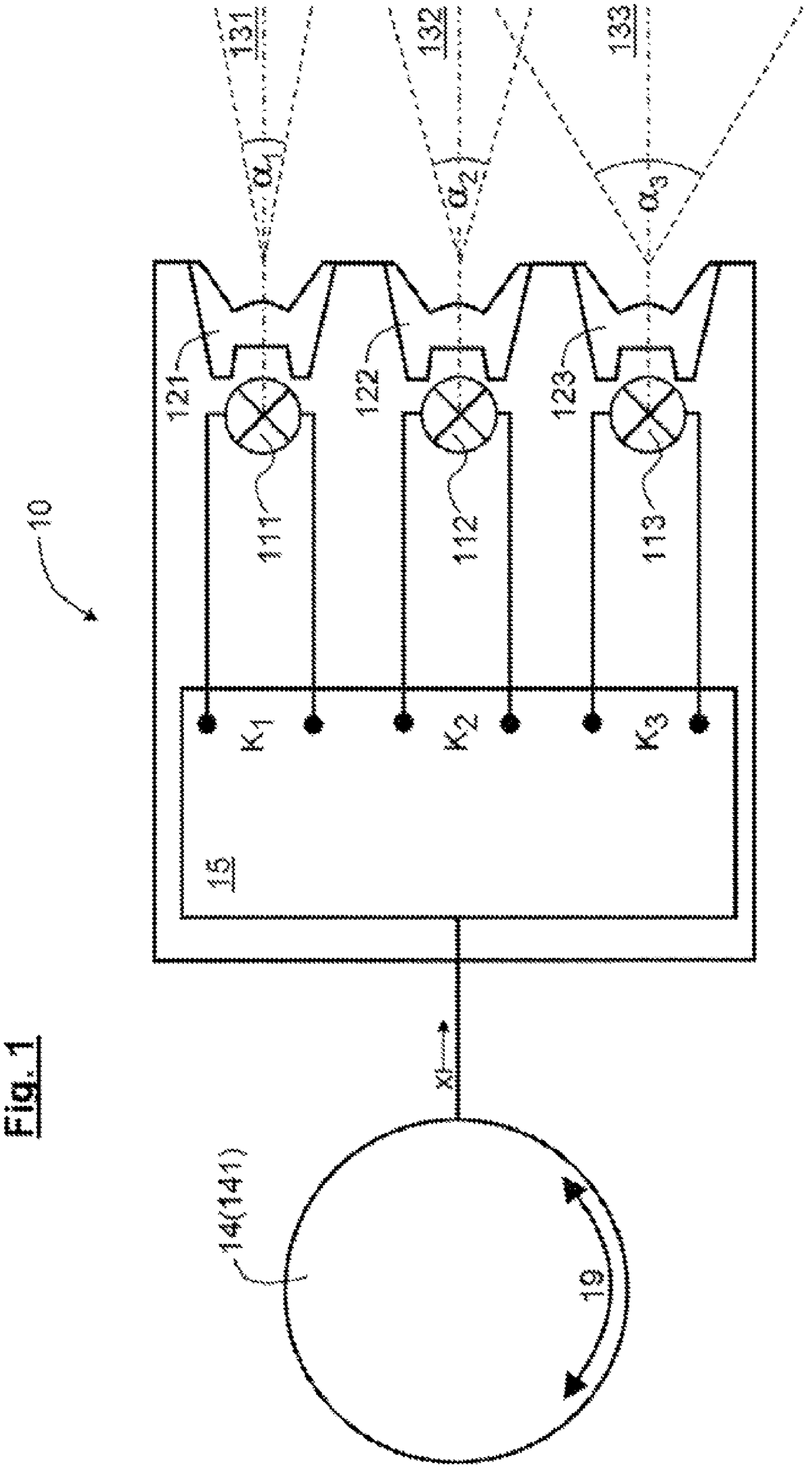
FIG. 1 is a schematic representation of a luminaire with three channels.

Referring to the drawings, FIG. 1 shows a schematic representation of a first embodiment of the invention. It shows a luminaire 10 with three channels $K_1$, $K_2$, $K_3$, which each have a light source 111, 112, 113 and a collimator 121, 122, 123. Each channel $K_1$, $K_2$, $K_3$, produces a light cone 131, 132, 133 with different opening angles $\alpha_1$, $\alpha_2$, $\alpha_3$, wherein the channels $K_1$, $K_2$, $K_3$ form a sequence, the light cone 131, 132, 133 of which have a progressively greater opening angle $\alpha$1, 2, 3. Consequently: $\alpha_1<\alpha_2<\alpha_3$. The intensities $l_n$ of the channels $K_1$, $K_2$, $K_3$ can be set by means of an actuator 14, wherein the actuator 14 in the exemplary embodiment shown is designed as a rotary encoder 141 and outputs a manipulated variable x to a control unit 15 as a function of its set rotational position. By rotating the actuator 14 in the arrow direction 19, the manipulated variable x changes and the channels $K_1$, $K_2$, $K_3$ produce a varying and manipulated variable-dependent intensity $l_n(x)$. The manipulated variable-dependent intensities $l_n(x)$ of the channels $K_1$, $K_2$, $K_3$ each follow a curve having a maximum as well as a rising edge and/or a falling edge, wherein the curves of adjacent channels $K_{n-1}$, $K_n$, $K_n+1$ are shifted in relation to one another in such a way that a reduction in the intensity $l_n(x)$ of a channel $K_n$ controlled by the actuator 14 is at least partially associated with an increase in the intensity $l_{n\pm1}$ (x) of an adjacent channel $K_{n\pm1}$ and vice versa. FIGS. 2*a-e* show different functional relationships of the channel-dependent intensities 1($x$) as a function of a manipulated variable x.

Figure 2A:
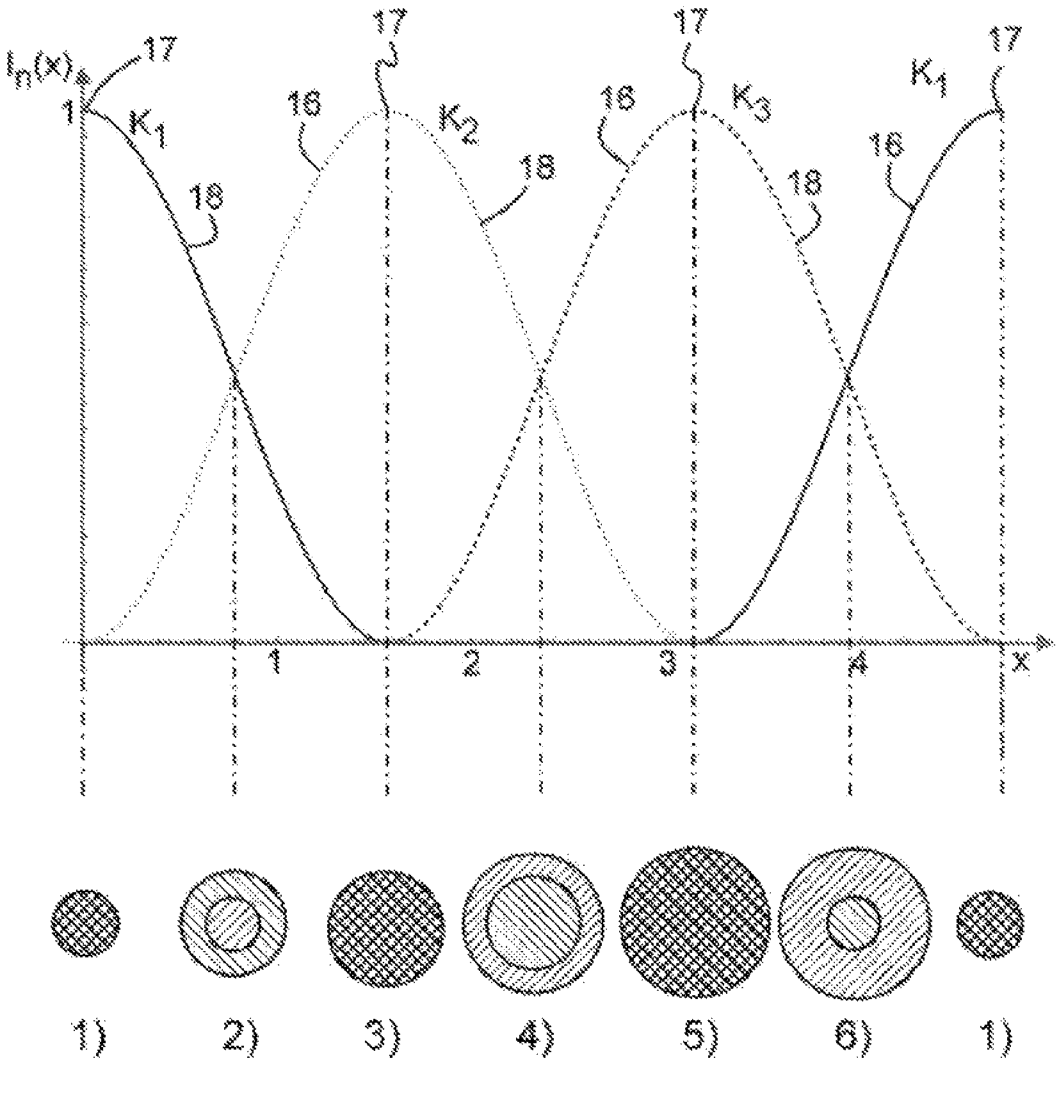
FIG. 2*a*, FIG. 2*b*, FIG. 2*c*, FIG. 2*d*, FIG. 2*e* and FIG. 2*f* are diagrams with different progressions of the channel-dependent intensities as a function of a manipulated variable.

FIG. 2*a* shows a first specific assignment of a manipulated variable x and the manipulated variable-dependent intensities $l_n(x)$ of the channels $K_1$, wherein the intensities $l_n(x)$ in FIG. 2*a* and in the following diagrams are shown in normalised form. According to this, the manipulated variable x=0 coincides with the maximum intensity $l_n(x)$ of the channel $K_1$, which in turn produces a light cone 131 with a comparatively small opening angle $\alpha_1$ and thus a spot beam (position 1). The pictograms below the diagram in FIG. 2*a* show the cross-sectional views of the light cones 131, 132, 133 as viewed at a constant distance from the luminaire 10, wherein a cross-hatched cross-section symbolises a higher intensity and a diagonally hatched cross-section symbolises a comparatively lower intensity. By changing the manipulated variable x to larger values, the intensity $l_n(x)$ of the channel $K_1$ initially decreases, while the intensity $l_2(x)$ of the adjacent channel $K_2$ on the right simultaneously increases. The channel $K_1$ thus follows a falling edge 18, whereas the channel $K_2$ follows a rising edge 16. At the point of intersection (position 2), the result is a light distribution with a larger diameter compared to position 1. A further increase of the manipulated variable x up to position 3 leads to the maximum intensity $l_2(x)$ of the channel $K_2$, while the other channels $K_1$, $K_3$ have a fading intensity $l_{1,3}(x)$. Further increasing the manipulated variable x increases the diameter of the light distribution, as the channel $K_3$ is controlled with increasing intensity $l_3(x)$. At position 4, a mixed light distribution results from channels $K_2$ and $K_3$, wherein the light cone has an opening angle $\alpha_3$ that is greater compared to the opening angle $\alpha_2$. A further increase of the manipulated variable x up to position 5 leads to a maximum intensity $l_3(x)$ of the channel $K_3$ and thus to a homogeneous illumination of the area ahead with a maximum opening angle $\alpha_3$, such that a flood beam is set in position 5. By further increasing the manipulated variable x, the intensity $l_n(x)$ of the channel $K_3$ decreases and the intensity $l_n(x)$ of the channel $K_1$ increases, because the channel $K_1$ in the exemplary embodiment shown is defined as a right-hand adjacent channel to the channel $K_3$. At position 6, the illumination of the channels $K_3$ and $K_1$ is weaker in intensity, which leads to the singular control of the channel $K_1$ when the manipulated variable x is increased further. Due to the shift or phase shift $\phi_n$ between the manipulated variable-dependent intensities $l_n(x)$ of the channels $K_n$, a continuous variation of the manipulated variable x allows a stepwise enlargement or reduction of the light cones 131, 132, 133. At the same time, the increase or decrease of the intensities $l_n(x)$ is continuous. This creates an electronically controlled zoom effect for optimal illumination of the area ahead.

Figure 2B:
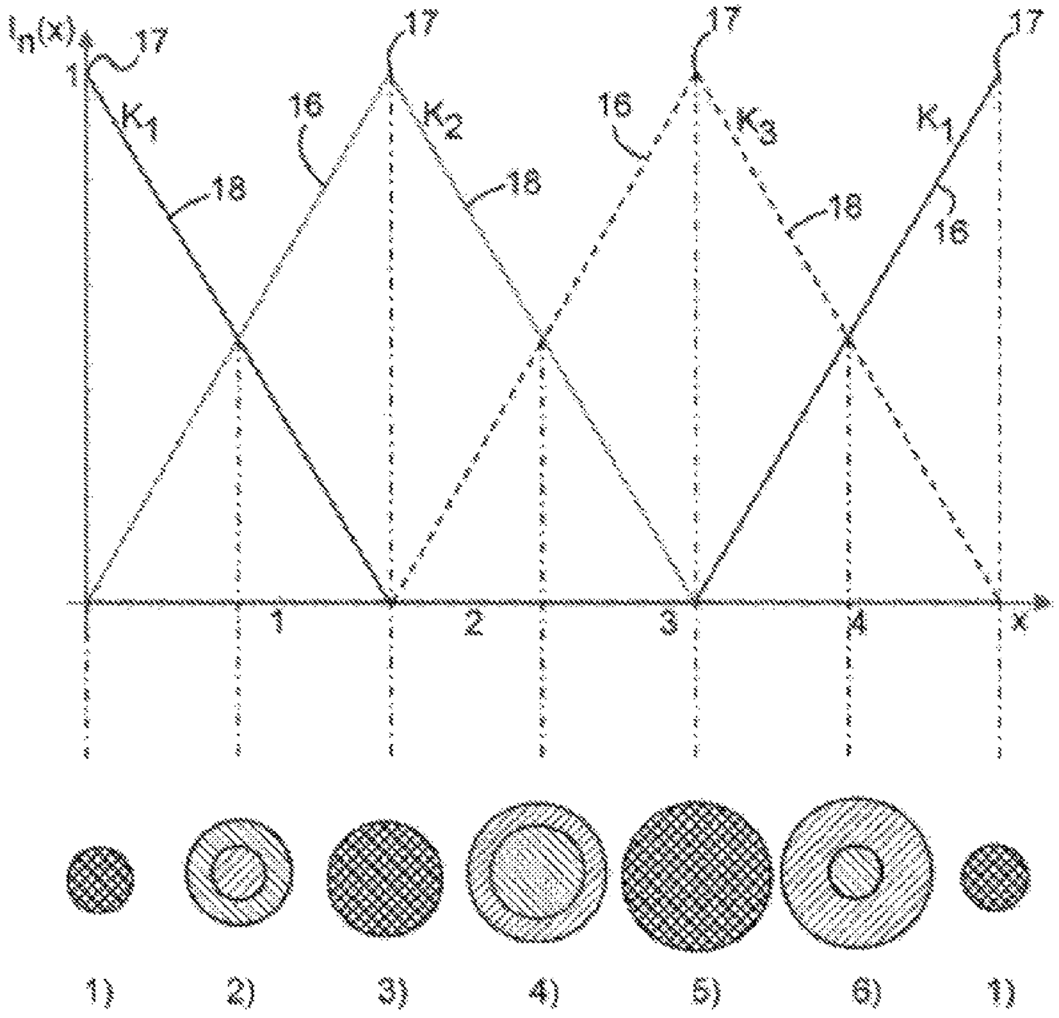

The (normalised) intensities $l_n(x)$ according to FIG. 2*a* are in the form $$l_n(x)=\sin^2(x+\phi_n),$$

wherein the phase shift $\phi_n$ is selected such that the maximum intensity of a channel $K_n$ coincides with the end of the falling edge 18 of the left-hand adjacent channel $K_{n-1}$ and with the beginning of the rising edge 16 of the right-hand adjacent channel $K_{n+1}$. Deviating from this, FIG. 2*b* shows a triangular course of the intensities $l_n(x)$ with a linear rising edge 16, a maximum 17 and a linear falling edge 18. However, the mode of operation and thus the fading of the channels $K_n$ by varying a predefinable manipulated variable x is analogous to the embodiment according to FIG. 2*a*.

Figure 2C:
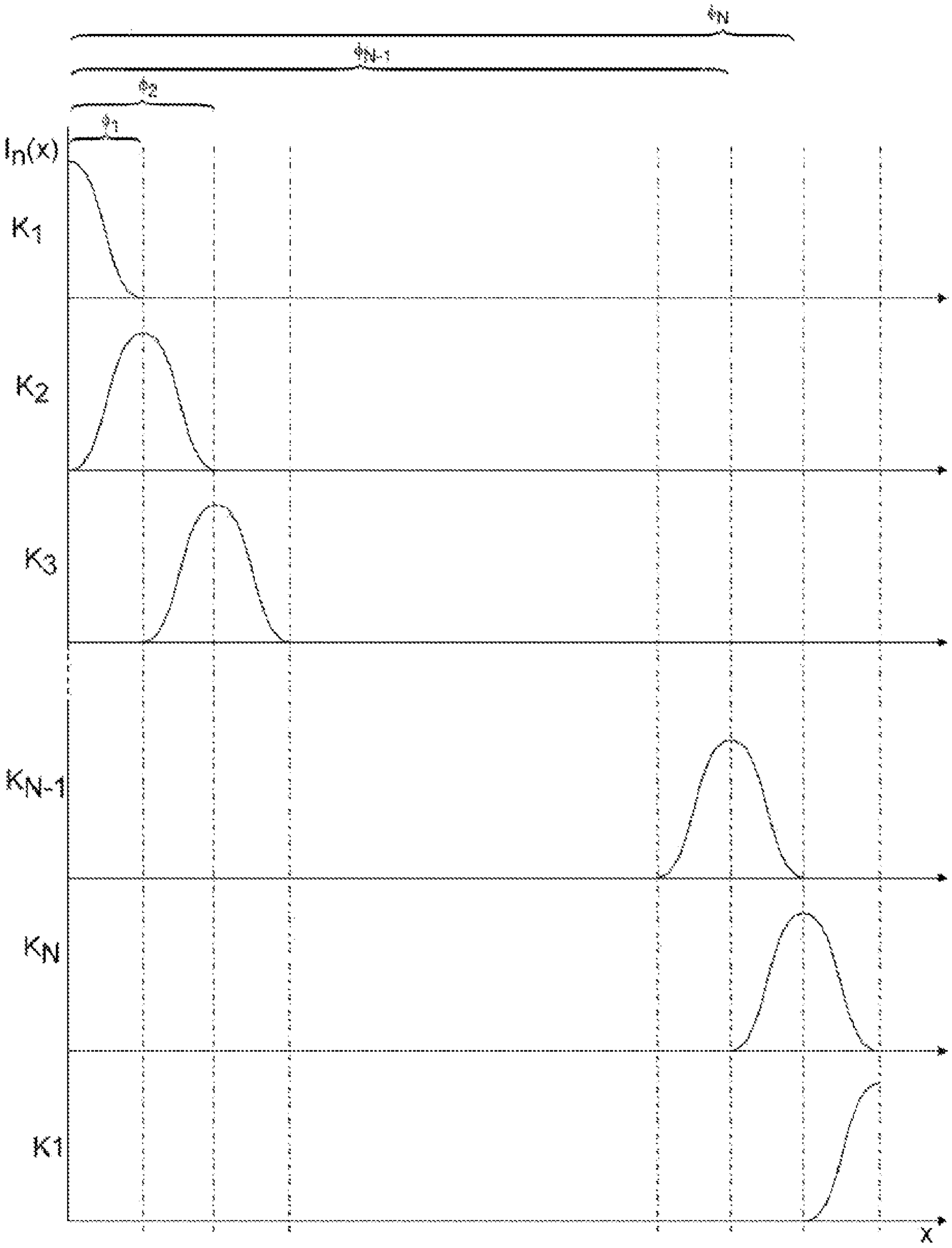

Essentially, the number of channels $K_n$ is unlimited. FIG. 2*c* shows the channel-dependent intensities $l_n(x)$ of the channels $K_1, \ldots, N$, each with a phase shift $\phi_n$, according with which the maximum intensity $l_n(x)$ of a channel $K_n$ coincides with the end of the falling edge 18 of the left-hand adjacent channel $K_{n-1}$ and with the beginning of the rising edge 16 of the right-hand adjacent channel $K_{n+1}$.

Figure 2D:
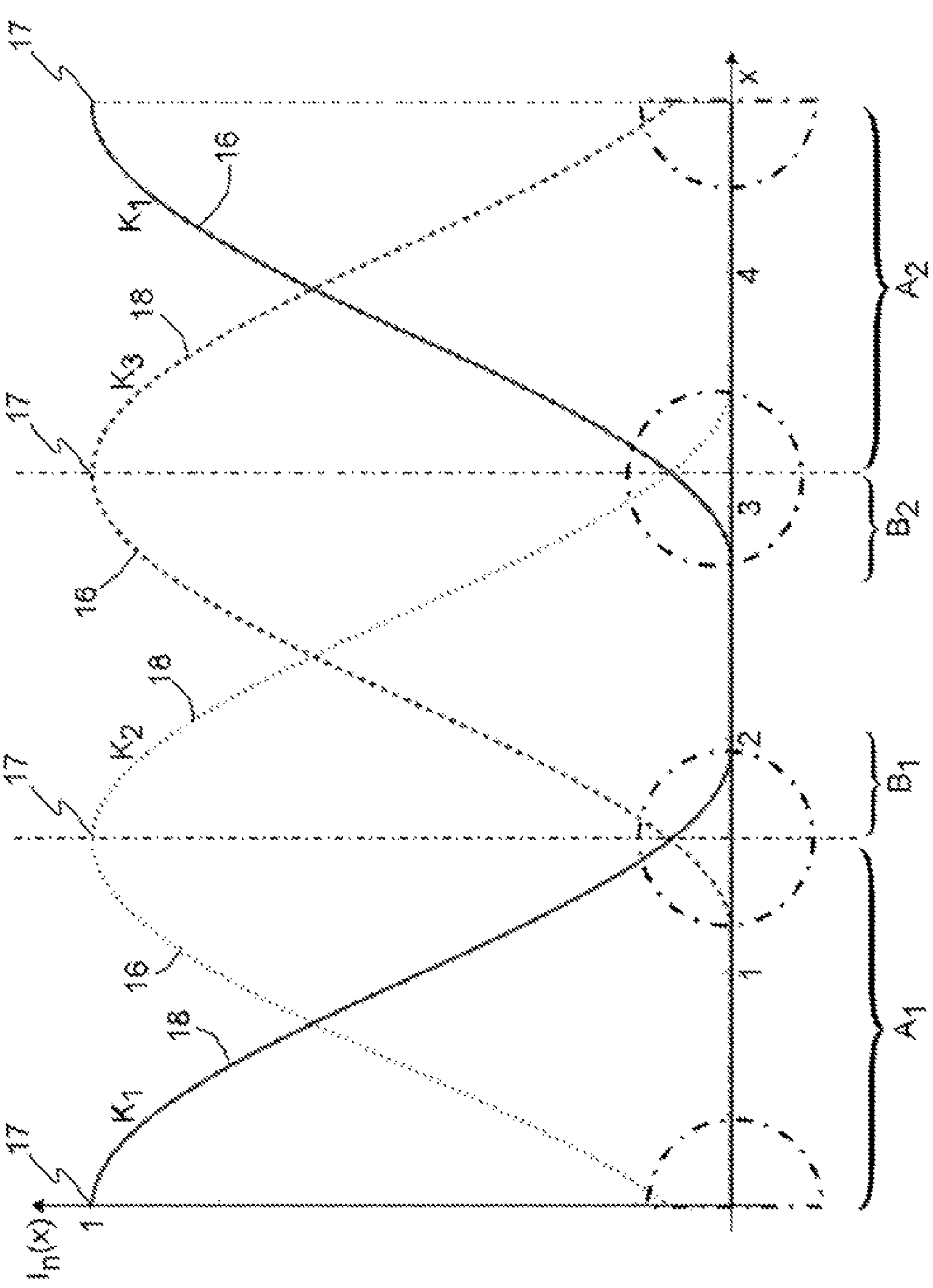

The shift or phase shift $\phi_n$ between the channel-dependent intensities $l_n(x)$ can also be selected smaller in deviation from FIG. 2*a, b, c* such that a reduction in the intensity $l_n(x)$ of a channel $K_n$ controlled by the actuator (14) is only partially associated with an increase in the intensity $l_{n\pm1}(x)$ of an adjacent channel $K_{n\pm1}$ and vice versa. FIG. 2*d* shows an exemplary embodiment of the invention with a comparatively smaller phase shift $\phi_n$, such that the maxima 17 of the channels $K_1$, $K_2$, $K_3$ within the dashed circles coincide with a residual intensity of the adjacent channels $K_{n\pm1}$. A reduction of the intensity $l_n(x)$ of the channel $K_1$ thus only leads to an increase of the intensity $l_n(x)$ of the adjacent channels $K_{2,3}$ in the areas $A_1$ and $A_2$ and thus in sections. Outside of this, i.e. in areas $B_{1,2}$, a reduction in the intensity $l_n(x)$ of the channel $K_1$ also leads to a reduction in the intensity of a subsequent channel. Specifically, in the area $B_1$, if the intensity $l_n(x)$ of the channel $K_1$ decreases, the intensity $l_2(x)$ of the channel $K_2$ also decreases. In the area $B_2$, both the intensity $l_n(x)$ of the channel $K_1$ and the intensity $l_3(x)$ of the adjacent channel $K_3$ increase as the manipulated variable x increases.

Figure 2E:
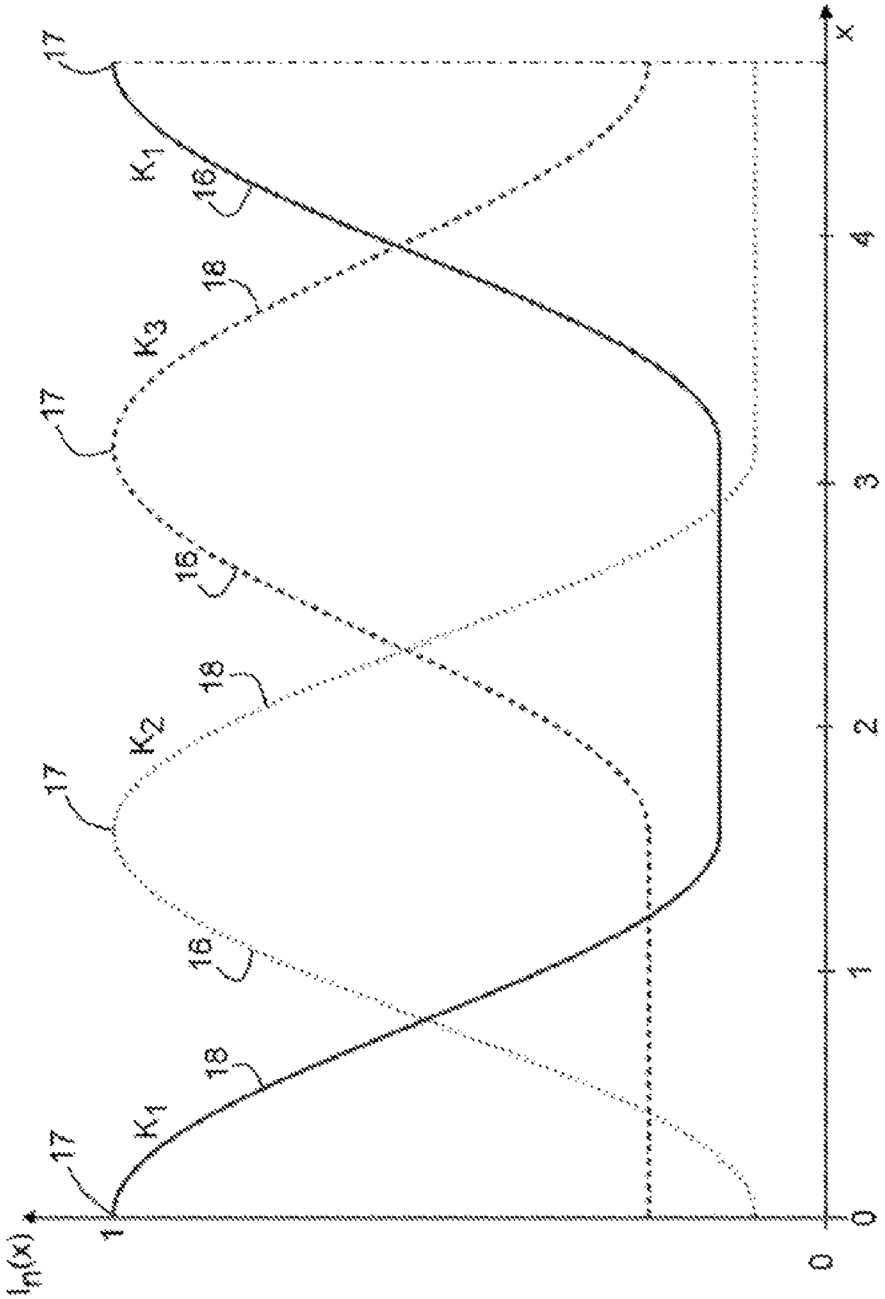

Furthermore, within a specific embodiment of the invention, it is provided that the intensities $l_n(x)$ of the channels $K_n$ do not fade outside the bell-shaped course, but have a constant value. FIG. 2*e* shows a corresponding curve of the channel-dependent intensities $l_n(x)$ as a function of the manipulated variable x. The basic intensity, i.e. the intensity $l_n(x)$ outside the bell-shaped area, can be identical or—as shown—different depending on the channel.

Figure 2F:
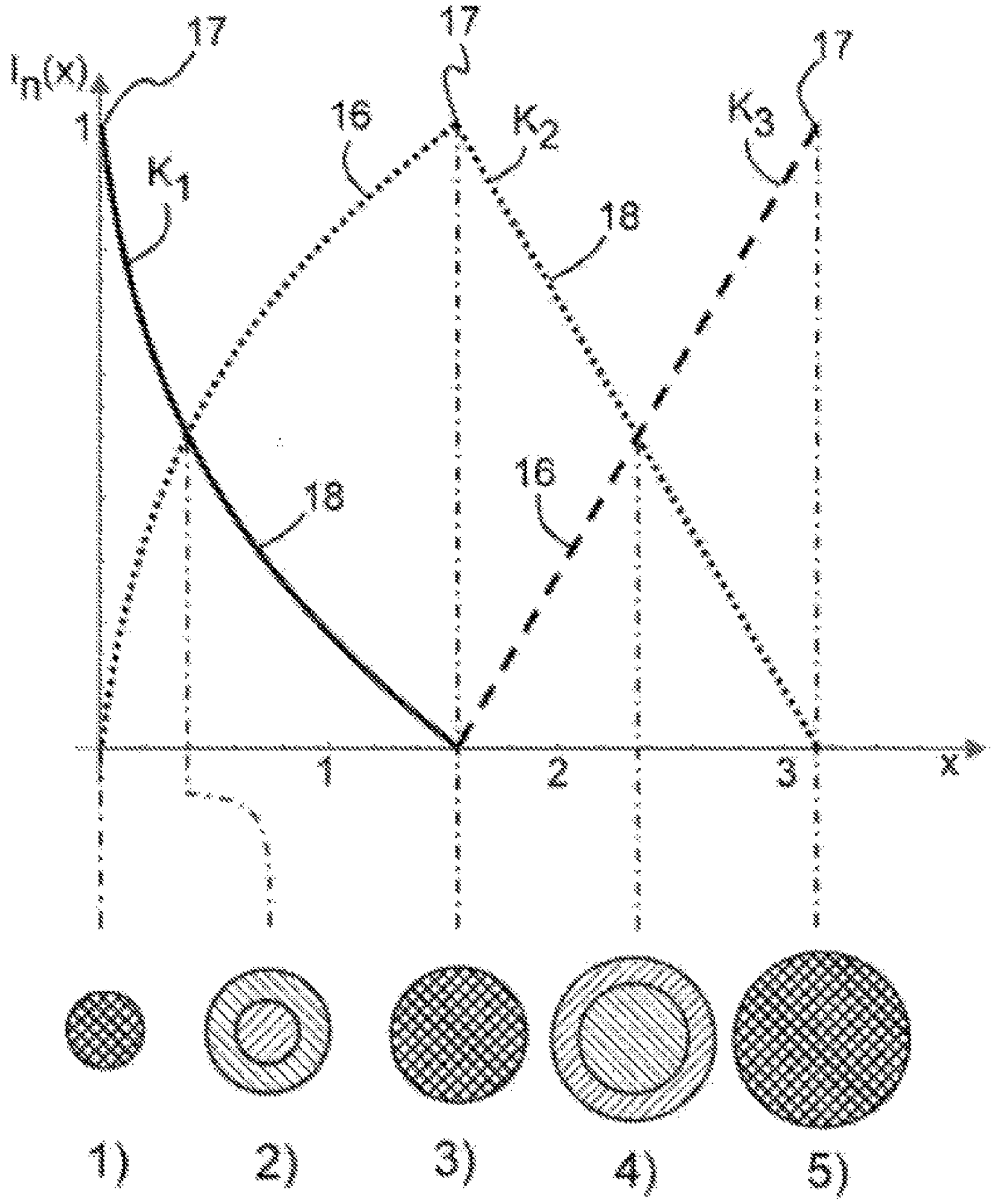

FIG. 2*f* shows a final exemplary assignment between a manipulated variable x and the manipulated variable-dependent intensities $l_n(x)$ of the channels $K_n$. According to this, the manipulated variable x=0 coincides with the maximum intensity $l_n(x)$ of the channel $K_1$, which in turn produces a light cone 131 with a comparatively small opening angle $\alpha_1$ and thus a spot beam (position 1). By changing the manipulated variable x to larger values, the intensity $l_n(x)$ of the channel $K_1$ initially decreases, wherein the intensity $k_1(x)$ follows a concave function, which means that the slope of the rising edge 16 becomes smaller as the manipulated variable x increases. Meanwhile, the intensity $l_2(x)$ of the right-hand adjacent channel $K_2$ increases simultaneously, wherein the intensity $l_2(x)$ follows a convex function, such that the slope of the descending edge 18 decreases as the manipulated variable x increases up to a maximum 17. At the point of intersection (position 2), the result is a light distribution with a larger diameter compared to position 1. A further increase of the manipulated variable x up to position 3 leads to the maximum intensity $l_2(x)$ of the channel $K_2$, while the intensities 11,3(*x*) of the other channels $K_1$, $K_3$ fade. Further increasing the manipulated variable x increases the diameter of the light distribution, as the channel $K_3$ is controlled with increasing intensity $l_3(x)$. The intensity $l_3(x)$ of the channel $K_3$ follows a form that is linearly dependent on the manipulated variable x, such that a linear rising edge is provided. At the same time, the intensity $l_2(x)$ of the channel $K_2$ decreases, wherein the manipulated variable-dependent reduction of the intensity $l_2(x)$ of the channel $K_2$ in this area also depends linearly on the manipulated variable x. Consequently, the channel $K_2$ has a linear falling edge 18. At position 4, a light cone is created with an opening angle $\alpha_3$ that is greater compared to the opening angle $\alpha_2$. A further increase of the manipulated variable x up to position 5 leads to a maximum intensity $l_3(x)$ of the channel $K_3$ and thus to a homogeneous illumination of the area ahead with a maximum opening angle $\alpha_3$, such that a flood beam is set in position 5. A mechanical and/or electronic stop of the encoder is provided at this point, such that no further increase of the manipulated variable x is provided. At least a further increase of the manipulated variable x does not lead to a change of the intensities $l_n(x)$ of the channel $K_n$ controlled in this position. In the context of an electronic stop, a vibration signal, a visual signal, for example in the form of a brief flash, and/or an acoustic signal, for example in the form of a sound, is preferably emitted to signal to the user that the stop has been reached. If necessary, different signals can be used for the right-hand stop and the left-hand stop. A light distribution according to position 1, 2, 3 or 4 is thus only possible by turning back or pushing back the encoder. A corresponding stop is also provided on the left-hand side of position 1, which is why the manipulated variable x can only be varied between positions 1 and 5.

While specific embodiments of the invention have been shown and described in detail to illustrate the application of the principles of the invention, it will be understood that the invention may be embodied otherwise without departing from such principles.

LIST OF REFERENCE NUMERALS

Luminaire
111 Light source
112 Light source
113 Light source
121 Collimator
122 Collimator
123 Collimator
131 Light cone
132 Light cone
133 Light cone
14 Actuator
141 Rotary encoder
Control unit
16 Rising edge
17 Maximum
18 Falling edge
19 Arrow direction
$\alpha_n$ Opening angle (channel-dependent)
99 $_n$ Phase shift (channel-dependent)
$A_{1,2}$ Area
$B_{1,2}$ Area
$l_n(x)$ Intensity (channel-dependent)
$K_n$ Channel
n Index
N Number of channels
N Set of natural numbers
x Manipulated variable

The invention claimed is:

1. A luminaire having a plurality of channels $K_n$, the channels each comprise a light source and a collimator, wherein each channel $K_n$ produces a light cone having different opening angles $\alpha_n$ and the channels $K_n$ form a sequence $(K_n)_n=1, \ldots, _N$, the light cones of which have progressively greater or progressively smaller opening angles $\alpha_n$ and an intensity $l_n(x)$ of the channels $K_n$ can be controlled by a setting of a manipulated variable x by means of an actuator, wherein the intensities $l_n(x)$ of the channels $K_n$ are dependent on the manipulated variable and each follow a curve having a maximum as well as a rising edge and/or a falling edge, wherein the curves of adjacent channels $K_n-1$, $K_n$, $K_n+1$ are shifted in relation to one another in such a way that a reduction in the intensity $l_n(x)$ of a channel $K_n$ controlled by the actuator is at least partially associated with an increase in the intensity $l_n\pm1$ (x) of an adjacent channel $K_n\pm1$, and an increase in the intensity $l_n(x)$ of a channel K controlled by the actuator is at least partially associated with a reduction in the intensity $l_n\pm1(x)$ of an adjacent channel $K_n\pm1$.

2. The luminaire according to claim 1, wherein the manipulated variable-dependent intensities $l_n(x)$ each follow a bell-shaped curve with a rising edge, a maximum and a falling edge.

3. The luminaire according to claim 2, wherein the maximum intensity $l_n$,max(x) of a channel $K_n$ coincides with the end of the falling edge of a left-hand adjacent channel $K_{n-1}$ and with the beginning of the rising edge of a right-hand adjacent channel $K_{n+1}$.

4. The luminaire according to claim 2, wherein the intensities $l_n(x)$ of the channels $K_n$ are linear in an area of the rising edge and/or in an area of the falling edge.

5. The luminaire according to claim 2, wherein the intensities $l_n(x)$ of the channels $K_n$ in an area of the rising edge and/or in an area of the falling edge follow a function in a form $l_n(x)=\sin^a(x+\phi_n)$, with the manipulated variable x, $\{a \in R|a\geq2\}$ and the channel-dependent phase shift $\phi_n$.

6. The luminaire according to claim 1, wherein the actuator is an encoder.

7. The luminaire according to claim 1, wherein the sequence $(K_n)_n=1, \ldots, _N$ of the channels $K_n$ is a finite sequence with a number of N channels $K_n$.

8. The luminaire according to claim 1, wherein the sequence $(K_n)_n=1, \ldots, _N$ of the channels $K_n$ is a periodic sequence with a period length of the number N of the channels $K_n$ such that the last channel $K_n$ is an adjacent channel of a first channel $K_1$.

9. The luminaire according to claim 1, wherein switching on of the luminaire coincides with the last setting made of the actuator.

10. The luminaire according to claim 2, wherein the intensities $l_n(x)$ of the channels $K_n$ disappear completely outside the bell-shaped curve.

11. The luminaire according to claim 1, wherein the actuator is a rotary encoder.

12. The luminaire according to claim 1, wherein the actuator is a slide control.

13. The luminaire according to claim 1, wherein the actuator is a push button.

14. The luminaire according to claim 1, wherein switching on of the luminaire coincides with a constant start setting.

15. The luminaire according to claim 2, wherein the intensities of the channels assumes a constant value outside the bell-shaped curve.

* * * * *